3,754,089
METHOD OF INHIBITING FERTILITY
IN FEMALE MAMMALS
Walter Edward Meyer, Suffern, and Leon Goldman, Nanuet, N.Y., assignors to American Cyanamid Company, Stanford, Conn.
No Drawing. Filed Aug. 31, 1971, Ser. No. 176,719
Int. Cl. A61k 27/00
U.S. Cl. 424—274                1 Claim

ABSTRACT OF THE DISCLOSURE

This disclosure describes compositions of matter useful as oral female antifertility agents and the method of inhibiting fertility in female mammals therewith, the active ingredient of said compositions of matter being coronaridine, a known alkaloid of the iboga type.

BRIEF SUMMARY OF THE INVENTION

This invention relates to novel compositions of matter useful as oral female antifertility agents. More particularly, it relates to therapeutic compositions containing coronaridine, or the non-toxic addition salts thereof, which inhibit fertility in female mammals. The invention includes the new compositions of matter and the method of inhibiting fertility in female mammals therewith. Coronaridine, which has been isolated from a variety of botanicals, may be represented by the following structural formula of known absolute configuration:

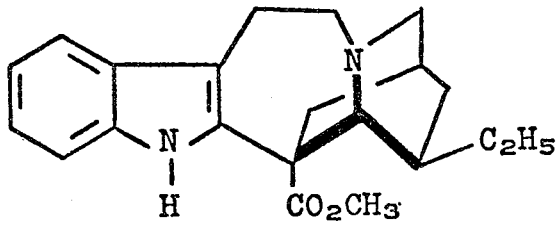

DETAILED DESCRIPTION OF THE INVENTION

Coronaridine forms non-toxic acid-addition salts with a variety of organic and inorganic salt-forming reagents. Thus, acid-addition salts, formed by admixture of the organic free base with one equivalent of an acid, suitably in a neutral solvent, are formed with such acids as sulfuric, phosphoric, hydrochloric, hydrobromic, sulfamic, citric, lactic, malic, succinic, tartaric, acetic, benzoic, gluconic, ascorbic, and related acids. For purposes of this invention coronaridine is equivalent to its non-toxic acid-addition salts.

The compositions of this invention provides a convenient mode of contraception through the use of an orally administered composition without inducing permanent reproductive sterility. It has been found that when compositions containing the above described active components were orally administered at sufficient dosages described hereinafter for 10 days to adult female rats which were cohabited with fertile male rats, pregnancy was prevented in all instances. Moreover, no accompanying maternal lethality was observed.

Accordingly, this invention includes within its scope the new compositions of matter for the control of mammalian female sexual reproduction and to methods of their administration. It is indicated that the favorable results achieved in rats with these compositions will relate to similar effects in other mammals as well. The novel compositions, therefore, are potentially useful for the control of female sexual reproduction in warm-blooded animals including domestic animals such as cattle, sheep and pigs and pest animals such as, for example, rats, weasels, foxes, etc.

There are several points of contraceptive attack during the normal processes of mammalian female reproduction. These points include ovulation blockage, interference with the fertilization of the ovum by sperm, interference with the normal transport of ova and/or zygotes in the reproductive tract, prevention of embryo implantation, disruption of the maternal response to embryonic implantation, and maternal failure to support embryonic survival. While the exact mechanism or mechanisms which take place with the active ingredients in effecting contraception is not clear, it is known that the compositions of this invention prevent conception by one or more of the above-mentioned occurrences. It is not intended, however, that the present invention be limited to any particular theory as to mechanism of contraception.

A decided practical advantage of the invention is that the active ingredients may be administered orally in any convenient manner. The compound, preferably, may be taken orally, for example, with an inert diluent or with an assimilable edible carrier, or by use of a pharmaceutically acceptable carrier compressed into tablets, or enclosed in hard or soft gelatin capsules. Other compositions include, for example, suspensions, syrups, elixirs, emulsions, wafers, and the like. Obviously, in addiiton to the therapeutic active ingredient there may be present excipients, binders, filers anld other inert ingredients necessary in the formulation of the desired pharmaceutical compositions. Preferred compositions or preparations according to the present invention are prepared so that a dosage unit form contains between about 10 milligrams and about 200 milligrams of the active component. These dosage unit forms may be administered one or more times per day, on a daily basis, during the period the anti-fertility effect is desired.

The amount of a single dose or of a daily dose to produce the desired level of efficacy should be such as to give a proportionate dosage of from about 1.0 mg. to about 10.0 mg./kg./day of active component. In terms of total weight of active component the daily dosage for warm blooded animals of, for example, 60 kilograms weight would amount to from about 100 mg. to about 500 mg. The dosage regimen may be adjusted to provide optimum response with the least amount of active ingredients.

The following examples illustrate the method of administering the novel compositions of this invention, their anti-fertility effect in female rats, and preparation of some formulations for oral administration.

Example 1

Adult Wistar strain female rats, maintained on a standard diet of laboratory rat pellets and water, ad libitum, are used. Graded doses of coronaridine hydrochloride are orally administered once daily for ten days to the female rats. The composition is composed of propylene glycol and an appropriate amount of active ingredient so that the desired dose is given in a 0.25 ml. volume. Control rats are given propylene glycol without the active ingredient. From the first day of treatment, the females are placed with fertile males in a ratio of four females to three males. Four days after the last dose the females were sacrificed and autopsied and uterine fetal implantation sites were counted. Results of this study are given in Table I below:

TABLE I

| Dose, mg./kg./day: | No. rats pregnant/ No. rats treated |
|---|---|
| 1 | 3/4 |
| 5 | 0/4 |
| 10 | 0/3 |
| 20 | 0/4 |
| 40 | 0/3 |

Example 2.—Hard gelatin capsules

|  | Grams |
|---|---|
| Coronaridine free base | 300 |
| Cornstarch | 1977 |
| Magnesium stearate, powder | 10 |
| Talc | 10 |

The finely divided ingredients are mixed thoroughly and then encapsulated in 10,000 two-piece hard gelatin capsules each containing 30 mg. of coronaridine free base.

Example 3.—Tablets 20,000 tablets each containing 50 mg. of coronaridine hydrochloride are prepared from the following ingredients:

|  | Grams |
|---|---|
| Coronaridine hydrochloride | 1000 |
| Lactose | 3719 |
| Starch | 200 |
| Calcium stearate | 40 |
| Talc | 40 |

Example 4.—Soft gelatin capsules

Five hundred one piece soft gelatin capsules for oral use each containing 90 mg. of coronaridine hydrobromide are prepared by first dispersing 45 grams of the compound in sufficient corn oil to render the material capsulatable and then encapsulating in the usual manner.

We claim:

1. The method of inhibiting fertility in a female mammal which comprises administering orally to said female mammal a contraceptively effective amount of a compound selected from the group consisting of coronaridine and the non-toxic acid-addition salts thereof.

References Cited

Kupchan et al.: Chem. Abst., vol. 59 (1963), page 12062d.

SAM ROSEN, Primary Examiner